United States Patent [19]

Kagohata

[11] Patent Number: 4,829,884
[45] Date of Patent: May 16, 1989

[54] BLOWOUT TEMPERATURE CONTROL SYSTEM

[75] Inventor: Tsuneo Kagohata, Ibaraki, Japan

[73] Assignee: Hitachi, Ltd., Tokyo, Japan

[21] Appl. No.: 184,067

[22] Filed: Apr. 20, 1988

[30] Foreign Application Priority Data

Apr. 22, 1987 [JP] Japan ................................ 62-97363

[51] Int. Cl.⁴ ............................................. B60H 1/00
[52] U.S. Cl. .................................... 98/2.01; 98/2.08;
165/16; 165/25; 165/43
[58] Field of Search ....................... 62/244; 98/2, 2.01,
98/2.08, 2.11; 165/16, 22, 25, 41, 42, 43; 237/2
A, 12.3 R, 12.3 A, 12.3 B

[56] References Cited

U.S. PATENT DOCUMENTS

| 4,513,808 | 4/1985 | Ito et al. ................................ 98/2.01 |
| 4,538,760 | 9/1985 | Kobayashi ........................... 237/2 A |
| 4,757,944 | 7/1988 | Kagohata ........................... 165/42 X |

FOREIGN PATENT DOCUMENTS

| 76318 | 5/1983 | Japan ........................................ 98/2 |
| 38120 | 3/1984 | Japan ........................................ 98/2 |
| 48218 | 3/1984 | Japan ..................................... 98/2.01 |
| 8810 | 1/1987 | Japan . |
| 3304 | 1/1987 | Japan . |
| 234712 | 10/1987 | Japan . |
| 68415 | 3/1988 | Japan . |

Primary Examiner—Harold Joyce
Attorney, Agent, or Firm—Antonelli, Terry & Wands

[57] ABSTRACT

In a blowout temperature control system of an air conditioner for use in vehicles, a temperature detected by a ventilation duct sensor is weighted by a first weighting ratio which varies depending on a wind amount of a ventilation duct. A temperature detected by a defroster duct sensor is weighted by a second weighting ratio which is determined by the first weighting ratio. The weighted mean is calculated from the weighted detection temperatures of the ventilation duct and defroster duct, so that a substantial blowout temperature is determined. A deviation temperature between the substantial blowout temperature and an object blowout temperature is calculated and the blowout control is performed such that the deviation temperature becomes zero.

5 Claims, 3 Drawing Sheets

BLOWOUT TEMPERATURE CONTROL SYSTEM

BACKGROUND OF THE INVENTION

The present invention relates to an air conditioner for use in automobiles and, more particularly, to a blowout temperature control system to automatically control a temperature of a blowout air.

A conventional blowout temperature control system of an air conditioner for use in an automobile is disclosed in, for example, JP-A-62-234712. According to this system, for a change in opening position of an air mixing door as heat exchangeable means, a temperature sensor to detect a blowout temperature is attached at an outlet port in which a blowout temperature changes in correspondence to the opening position of the air mixing door. The opening position of the air mixing door is controlled such that the difference between a detection signal from the temperature sensor and an object blowout temperature signal which has previously been calculated approaches 0. That is, the air mixing door is controlled in a one-to-one corresponding relation between one air mixing door and one blowout temperature detecting sensor (hereinbelow, referred to as a duct sensor). According to this system, in response to a change in blowout mode (bilevel blowout, defroster blowout, or the like) of the air conditioner, the duct sensor corresponding to each air mixing door is also switched (for instance, the switching from the ventilation duct sensor to the defroster duct sensor is performed). However, at a certain time, one duct sensor certainly corresponds to one air mixing door and operates.

On the other hand, the function on the air conditioner unit side is disclosed in, e.g., Japanese Utility Model Laid open No. 62-3304. This cited reference proposes a system in which the blowing mode, i.e., a wind amount ratio from each outlet port is continuously changed to eliminate a sense of incompatibility when the blowing mode is switched.

The above conventional technique switches the corresponding duct sensor in response to a change in blowing mode and uses. In general, for a predetermined opening position of the air mixing door, the air temperature at each outlet port differs (the temperature at the ventilation outlet port is set to be low and the temperature at the floor outlet port is set to be high in order to obtain an ideal temperature condition such that the area around the head is cool and the area around the feet is warm). Thus, there occurs a problem such that when the duct sensor is switched, the signal becomes discontinuous and the blowout temperature suddenly changes. According to the conventional mode switching, when the duct sensor is switched, the outlet port also simultaneously changes by 100% (i.e., the outlet port is fully closed or opened). Therefore, the sudden change in the blowout temperature does not occur and since the outlet port itself changes, the passengers do not delicately feel the change in the blowout temperature.

To solve the foregoing problems, a method whereby the duct sensor to be used is fixedly set to either one of the duct sensors in place of switching the duct sensors is known. According to this method, when the ratio of the blowout wind amount from the relevant outlet port decreases due to a change in blowing mode, the response speed (sensitivity) of the duct sensor deteriorates, so that an unstable phenomenon of the control system such as a hunting of the blowout temperature or the like occurs.

On the other hand, as another method of solving the foregoing problems, there is also proposed a method whereby a discontinuous amount of the signal from the duct sensor which is generated when the duct sensor is switched is previously predicted and this discontinuous signal is corrected upon control. However, the deviation in temperature of the air from each outlet port largely changes due to various conditions (opening degree of air mixing door, blowout wind amount, operating state of a compressor, and the like), so that it is difficult to perfectly correct the discontinuous amount.

SUMMARY OF THE INVENTION

It is an object of the present invention to provide a control system of an air conditioner for use in automobiles in which even if the blowing mode is continuously changed, a sudden change in blowout temperature does not occur and a comfortable feeling is obtained and the high control stability is derived.

This object is accomplished by a method whereby when the blowing mode, that is, the ratio of wind amount from each outlet port continuously changes, a signal from a duct sensor attached to each outlet port is weighted in accordance with each wind amount ratio, and the opening position of the corresponding air mixing door is controlled on the basis of the weighted signal. Namely, a blowout temperature control system of an air conditioner for use in automobiles according to the invention comprises:

a ventilation duct sensor, attached to a ventilation duct, for detecting a temperature of air which is blown out from the ventilation duct;

a defroster duct sensor, attached to a defroster duct, for detecting a temperature of air which is blown out from the defroster duct;

main weighting means for weighting the temperature detected by the ventilation duct sensor by a first weighting ratio which varies depending on an amount of wind of the ventilation duct;

auxiliary weighting means for weighting the temperature detected by the defroster duct sensor by a second weighting ratio which is determined by the first weighting ratio;

weighted mean means for calculating a weighted mean of the detection temperature of the ventilation duct which was weighted by the main weighting means and the detection temperature of the defroster duct which was weighted by the auxiliary weighting means, thereby determining a substantial blowout temperature;

operating means for subtracting the substantial blowout temperature determined by the weighted mean means from a predetermined object blowout temperature, thereby calculating a deviation temperature; and substantial average temperature at a plurality of relevant outlet ports. Since the opening position of the air mixing door is controlled such that the substantial average temperature coincides with a necessary temperature, the temperature of the blowout air from each outlet port eventually substantially becomes a blowout temperature at which the passengers can feed most comfortable.

BRIEF DESCRIPTION OF THE DRAWINGS

The above and other objects and features of the present invention will become apparent from the following detailed description and the appended claims with reference to the accompanying drawings.

DESCRIPTION OF THE PREFERRED EMBODIMENTS

Figure 1:
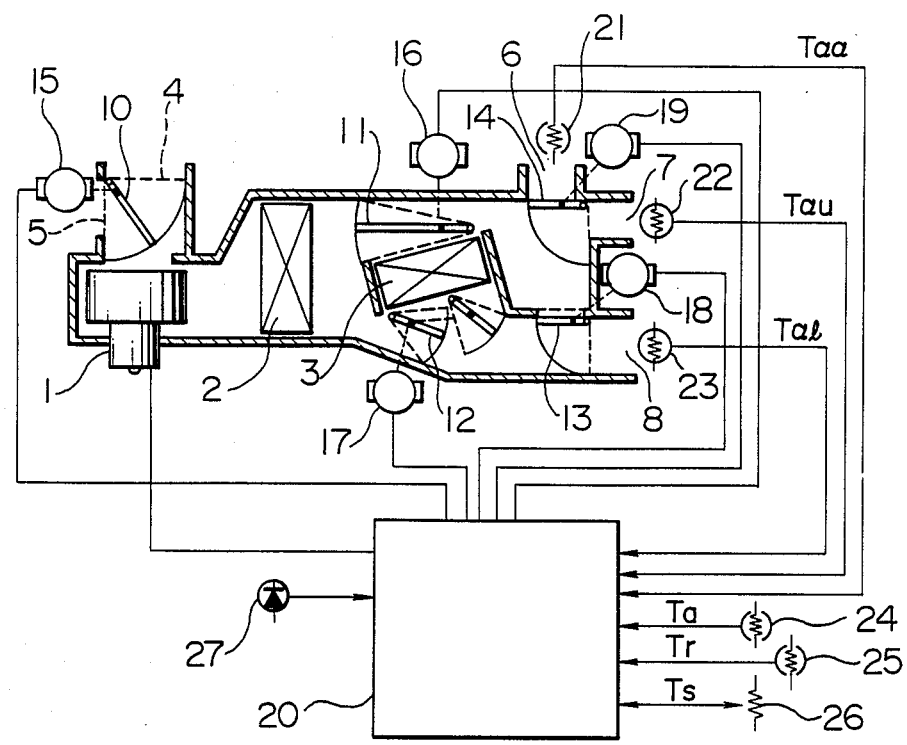
FIG. 1 is a constitutional diagram of an air conditioner system showing the first embodiment of the present invention.

The first embodiment of the present invention will now be described in FIG. 1. In FIG. 1, reference numeral 1 denotes a blower motor to blow out a wind; 2 indicates an evaporator to cool an air; 3 a heater core to heat the air; 4 an outside air inlet port to suck the outside air into an air conditioner; 5 an inside air inlet port to suck the air in the room of a vehicle; 6 a defroster outlet port to demist the front glass; 7 a ventilation outlet port to blow out the air into the whole vehicle room; 8 a floor outlet port to blow out the air toward the area around the feet to blow out the air toward the area around the feet of a driver; 10 an intake door to switch between the circulation of the inside air and the suction of the outside air; 11 an upper air mixing door to mix the heated air and the cooled air; 12 a pair of lower air mixing doors to mix the heated air and the cooled air; 13 a floor door to open or close the floor outlet port 8; 14 a ventilation door to switch between the defroster outlet port 6 and ventilation outlet port 7; 15, 16, 17, 18, and 19 electric actuators to continuously change opening degrees of the intake door 10, upper air mixing door 11, lower air mixing doors 12, floor door 13, and ventilation door 14; 21 a defroster duct sensor to detect a temperature of blowout air from the defroster outlet port 6; 22 a ventilation duct sensor to detect a temperature of blowout air from the ventilation outlet port 7; 23 a floor duct sensor to detect a temperature of blowout air from the floor outlet port 8; 24 an outside air temperature sensor to detect a temperature of air in the outside of the vehicle room; 25 an inside air temperature sensor to detect a temperature of air in the vehicle room; 26 a temperature setting volume to set a temperature of air in the vehicle room to a desired value; 27 a solar radiation amount sensor to detect an amount of solar radiation in the vehicle room; and 20 a control system to give control signals to the respective motor and actuators on the basis of detection signals from those various kinds of sensors.

Figure 2:
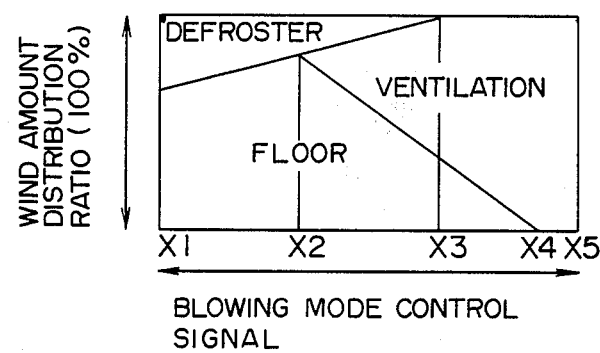
FIG. 2 is a characteristic diagram showing a distribution ratio of blowout amounts in the air conditioner system shown in FIG. 1.

The continuous switching of the blowing more and the operations of the duct sensors regarding the present invention will now be explained with reference to FIGS. 1 and 2. As the outlet ports to blow out the air from the air conditioner into the vehicle room, the defroster outlet port 6, ventilation outlet port 7, and floor outlet port 8 are provided as shown in FIG. 1. The state of blowing mode is determined in consideration of the comfortableness of passengers and a viewpoint to keep the front visual range and these conditions are mainly decided by an outside air temperature $T_a$. Hitherto, either one of the ventilation mode, bilevel mode, and heater (demisting) mode is generally selected as the blowing mode. However, to satisfy the comfortableness of the passengers finer, the blowing mode needs to be continuously changed as shown in FIG. 2. To continuously control the blowing mode as shown in FIG. 2, in FIG. 1, the electric actuator 18 to actuate the floor door 13 and the electric actuator 19 to actuate the ventilation door 14 are provided, thereby enabling the opening position of each door to be continuously controlled. FIG. 1 shows the air conditioning operation when the blowing mode is set to the bilevel mode and corresponds to the position of $X_3$ on an axis of abscissa in FIG. 2. By gradually closing the floor door 13 from the stat shown in FIG. 1, a wind amount from the floor outlet port gradually decreases. When the floor door 13 is perfectly closed, the blowing mode is set to the ventilation mode. In FIG. 2, this corresponds that the blowing mode control signal moves from the position $X_3$ on the axis of abscissa to a position $X_5$ through $X_4$. On the other hand, when the ventilation door 14 is gradually closed from the state shown in FIG. 1, the wind amount from the ventilation outlet port gradually decreases and at the same time, the wind is gradually blown out from the defroster outlet port. In FIG. 2, this corresponds that the control signal moves from the position $X_3$ on the axis of abscissa to the position $X_2$. If the floor door 13 is further slowly closed when the ventilation door 14 is fully closed, the wind amount from the floor outlet port is reduced. In response to this reduction, the wind amount from the defroster outlet port increases. This corresponds to the state at the position $X_2$ on the axis of abscissa in FIG. 2.

As described above, by continuously changing the opening positions of the ventilation door 14 and floor door 13 in response to the blowing mode control signal, the continuous change in the blowing mode shown in FIG. 2 can be realized. The above technique is disclosed in Japanese Utility Model Laid-open No. 62-3304 which has been shown as an example of a background art.

In the invention, to independently detect the blowout temperature at each outlet port of the air conditioner unit mentioned above, the defroster duct sensor 21, ventilation duct sensor 22, and floor duct sensor 23 are attached to the corresponding outlet ports as shown in FIG. 1, respectively. Temperature detection signals from these sensors are supplied to the control system 20. In accordance with the blowing mode of the air conditioner, the control system 20 controls the opening position of the corresponding air mixing door on the basis of the signals from the duct sensor which is effective at that time point.

Figure 3:
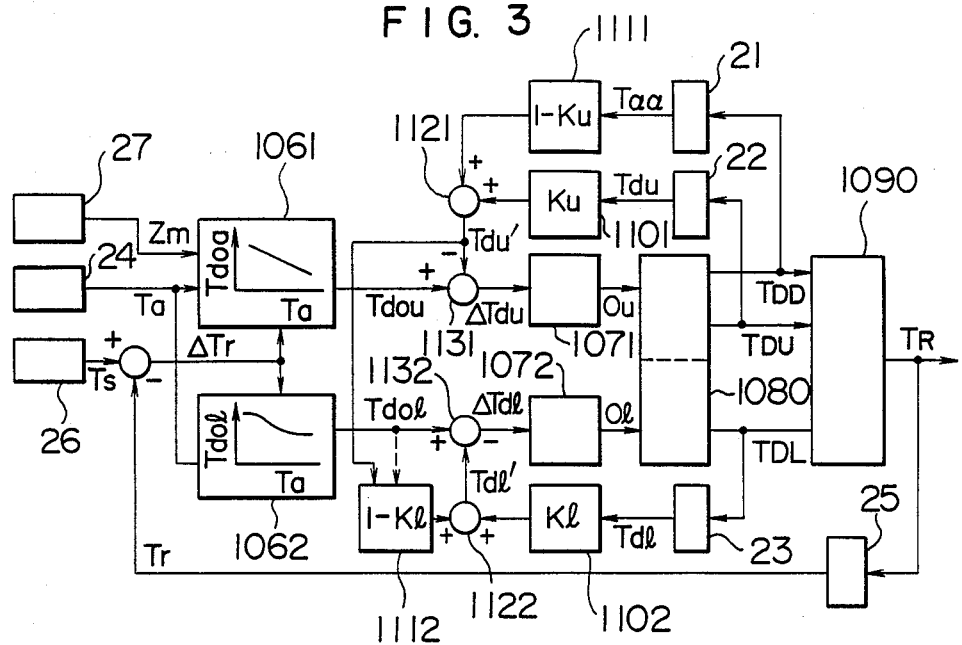
FIG. 3 is a control block diagram showing states of control signals in the air conditioner system shown in FIG. 1.

A control method based on the detection signals from those various sensors will now be described with reference to FIG. 3. In FIG. 3, reference numeral 21 denotes the defroster duct sensor; 22 is the ventilation duct sensor; 23 the floor duct sensor; 24 the outside air temperature sensor; 25 the inside air temperature sensor; 26 the temperature setting volume; and 27 the solar radiation amount sensor. These sensors correspond to the sensors shown in FIG. 1. Reference numerals 1071 and 1072 denote upper and lower blowout temperature control units. The control unit 1071 corresponds to the upper air mixing door 11 and electric actuator 16 in FIG. 1. The control unit 1072 corresponds to the lower air mixing door 12 and electric actuator 17 in FIG. 1. Reference numeral 1080 denotes a whole air conditioner unit shown in FIG. 1 and 1090 represents an equivalent heat capacity in the vehicle room. The other portions are processed by a microcomputer in the control system 20 in accordance with a program in the embodiment. In FIG. 3, the processes to calculate object blowout temperatures $T_{dou}$ and $T_{dol}$ in the upper and lower portions on the basis of a signal $T_s$ from the temperature setting volume 26, a signal $T_r$ from the inside air temperature sensor 25, a signal $T_a$ from the outside air temperature sensor 24, and a signal $Z_m$ from the solar radiation amount sensor 27 and the process in which the inside air temperature changes because blowout temperatures $T_{DD}$, $T_{DU}$, and $T_{DL}$ from the outlet ports act on the equivalent heat capacity 1090 in the vehicle room are shown by the following equations for the arithmetic operating control processes in the block diagram shown in FIG. 3.

$$\Delta T_r = T_s - T_r \quad (1)$$

$$\begin{cases} T_{dou} = f_u(T_a) - K_1 \times Z_m + K_2 \times \Delta T_r \\ T_{dol} = f_L(T_a) + K_2 \times \Delta T_r \end{cases} \quad (2)$$

$$\Delta T_{dx} = T_{dox} - T_{dx} \quad (4)$$

$$O_x = K_3 \times \Delta T_{dx} + K_4 \int \Delta T_{dx}\, dt + K_5 \quad (5)$$

where, $K_1$ to $K_5$ are constants, t is a time, and x indicates u or l.

$f_U(T_a)$ in the equation (2) and $f_L(T_a)$ in the equation (3) are functions to obtain the comfortable object blowout temperatures $T_{dox}$ for the outside air temperature $T_a$ in the case of no solar radiation. This function is obtained by experiments and almost similar curves are obtained irrespective of the kind of vehicle or the difference between male and female, or the like. In the embodiment, to cool the head and to warm the feet, $f_U(T_a)$ is set to be lower than $f_L(T_a)$. These temperatures are set to lower values with an increase in outside air temperature. In general, when the outside air temperature $T_a=20°$ C., $f_U(T_a)$ and $f_L(T_a)$ are set to values about $f_U(T_a)=15°$ C.

$f_L(T_a)=30°$ C.

On the other hand, when comparing the equations (2) and (3), the term of $-K_1 \times Z_m$ is included in only the equation (2) because of the following reason. That is, since the upper half body expressed by the equation (2) is influenced by the solar radiation amount $Z_m$, by reducing the object blowout temperature $T_{do}$ in accordance with the solar radiation amount $Z_m$, the comfortable conditions are obtained; however, on the side of the feet, there is no need to consider the influence by the solar radiation. The equation (2) corresponds to the operating process of an object blowout temperature operating apparatus 1061 on the upper side. The equation (3) corresponds to the operating process of an object blowout temperature operating apparatus 1062 on the lower side (foot side).

The equation (5) corresponds to the operating processes of the blowout temperature control units 1071 and 1072. In the embodiment, in order to provide the perfect comfortableness by setting the stationary difference between the object blowout temperature $T_{dou}$ and the actual blowout temperature $T_D$ to 0, a PI (proportional, integrating) control system in an automatic control is used as will be understood from the equation (5).

The blowout temperature control system which is newly used in the invention will now be described in detail hereinbelow. In FIG. 3, reference numerals 1101 and 1102 denote main duct sensor weighting means for weighting the temperatures detected by the ventilation duct sensor 22 and floor duct sensor 23 by an upper weighting ratio $K_u$ and a lower weighting ratio $K_l$. Reference numerals 1111 and 1112 represent auxiliary duct sensor weighting means for weighting the temperature detected by the defroster duct sensor 21 by an upper weighting ratio $(1-K_u)$ and for weighting the upper substantial blowout temperature by a lower weighting ratio $(1-K_l)$.

Reference numeral 1121 indicates upper weighted means for obtaining the weighted mean of the upper main weighting means 1101 and upper auxiliary weighting means 1111, thereby determining the upper substantial blowout temperature.

Reference numeral 1131 denotes upper operating means for subtracting the upper substantial blowout temperature from the upper object blowout temperature, thereby calculating an upper deviation temperature.

Reference numeral 1122 denotes lower weighted mean means for obtaining the weighted mean of the lower weighting means 1102 and lower auxiliary weighting means 1112, thereby determining a lower substantial blowout temperature.

Reference numeral 1132 denotes lower operating means for subtracting the lower substantial blowout temperature from the lower object blowout temperature, thereby calculating a lower deviation temperature.

The operation to control the blowout temperature on the upper side in the vehicle room will be first described. The wind of the temperature $T_{DD}$ is distributed from the air conditioner unit 1080 to the defroster outlet port in accordance wit the blowing mode of the air conditioner. The wind of the temperature $T_{DU}$ is distributed to the ventilation outlet port. In this case, the wind is distributed in accordance with the wind amount distribution ratio shown in FIG. 2. The blowout temperatures at the defroster outlet port and ventilation outlet port are converted into temperature signals $T_{dd}$ and $T_{du}$ by the defroster duct sensor 21 and ventilation duct sensor 22. Practically speaking, when the blowing mode control signal is in the state at the position $X_3$ in FIG. 2, no wind is blown out from the defroster outlet port. Therefore, the ambient air temperature instead of the actual blowout temperature is detected as a detection temperature by the defroster duct sensor 21. On the contrary, when the blowing mode signal is in the state of $X_2$, since no wind is blown out from the ventilation outlet port, the ambient air temperature is detected by the ventilation duct sensor. These ambient air temperatures do not always correspond to the opening position of the upper air mixing door provided in the blowout temperature control unit 1071. Therefore, to stably control the upper air mixing door, it is necessary to recognize the substantial blowout temperature which changes in accordance with a change in opening position of the upper air mixing door. In this embodiment, the opening position change of the upper air mixing door directly influences the defroster blowout temperature $T_{DD}$ and ventilation blowout temperature $T_{DU}$ in terms of the structure of the air conditioner unit. Therefore, the main duct sensor weighting means 1101 and auxiliary duct sensor weighting means 1111 are provided on the downstream side of each of the detection signals of the ventilation blowout temperature and defroster blowout temperature, thereby calculating a signal $T_{du}'$ as a weighted mean by a weighting ratio shown in FIG. 4A from the signals $T_{dd}$ and $T_{du}$ from the duct sensors. $T_{du}'$ is obtained by the following equation in the program of the microcomputer.

$$T_{du}' = \frac{K_u}{100} \cdot T_{du} + \left(1 - \frac{K_u}{100}\right) \cdot T_{dd} \quad (6)$$

As will be understood by comparing FIGS. 2 and 4, $K_u$ represents the ratio (%) of the wind amount from the ventilation outlet port to the total wind amount from the ventilation and defroster outlet ports. It is possible to consider that $T_{du}'$ calculated by the equation (6) indicates the substantial blowout temperature responsive to the change in the opening position of the upper air mixing door. The blowout temperature control unit 1071 operates on the basis of the arithmetic operating process of the equation (5) in a manner such that the detected substantial blowout temperature $T_{du}'$ coincides with the object blowout temperature $T_{dou}$ which has previously been calculated.

Figure 4A:
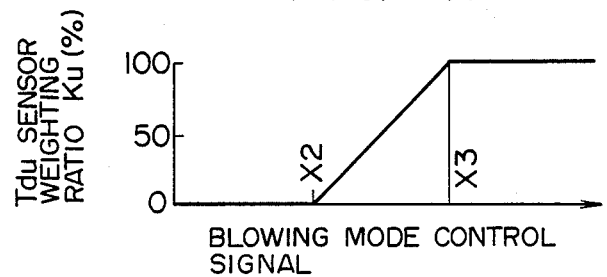
FIGS. 4A and 4B, 5A and 5B are characteristic diagrams of sensor weighting ratios showing the second and third embodiments of the invention, respectively.
Figure 4B:
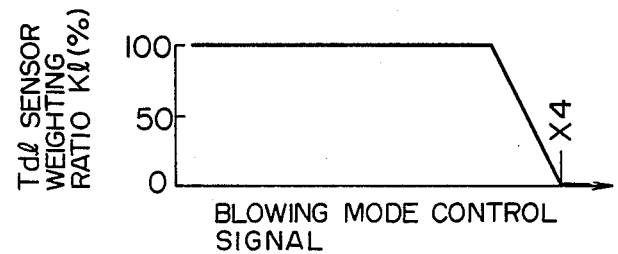

The operation to control the blowout temperature on the lower side in the vehicle room in FIG. 3 will now be described. The change in the opening position of the blower air mixing door mainly influences the floor blowout temperature $T_{DL}$. However, when the floor door 13 is not fully open, a part of the wind flows out to the ventilation outlet port 7 or defroster outlet port 6. Therefore, with respect to the blowout temperature control operation on the lower side of the vehicle room, the main duct sensor weighting means 1102 is provided on the downstream side of the floor blowout temperature $T_{dl}$. The auxiliary duct sensor weighting means 1112 is provided on the downstream side of the substantial blowout temperature $T_{du}'$ on the upper side of the vehicle room. The signal $T_{dl}'$ as a weighted means obtained by a weighting ratio shown in FIG. 4B is set to the substantial blowout temperature on the lower side of the vehicle room. This temperature is calculated by the following equation.

$$T_{dl}' = \frac{K_l}{100} \cdot T_{dl} + \left(1 - \frac{K_l}{100}\right) \cdot T_{du}' \quad (7)$$

As will be understood by comparing FIGS. 2 and 3, there is provided a characteristic such that the weighting ratio $K_l$ on the lower side of the vehicle room does not always coincide wit the ratio of the wind amounts from the ventilation outlet port (or defroster outlet port) and the floor outlet port. If the change in the weighting ratio has no discontinuous point for a change in blowing mode, the object of the invention can be accomplished. In this embodiment, for the substantial wind amount ratio, the blowout temperature on the foot side is regarded as important. When an enough amount of wind is blown out from the foot side, the weighting ratio of the $T_{dl}$ sensor is set to a large value.

The blowout temperature control unit 1072 operates in a manner such that the substantial blowout temperature $T_{dl}'$ on the lower side which was obtained by the foregoing equation coincides with the object blowout temperature $T_{dol}$ which has previously been calculated.

As described above, in accordance with the blowing mode (distribution ratio of the blowout wind amount) which continuously changes, the weighted mean is calculated from the temperature signals from the duct sensors, thereby obtaining each substantial blowout temperature. The control is performed such that the substantial blowout temperature coincides with each object blowout temperature. Due to this, even if the blowing mode continuously changes, a sudden change in blowout temperature does not occur. In addition, the temperature control is performed such that the substantial blowout temperature coincides with the object blowout temperature. In other words, the temperature in consideration of the wind amount distribution ratio is maintained to the comfortable temperature which has previously been calculated. Thus, there is an advantage such that the very comfortable temperature control state is derived.

Figure 5A:
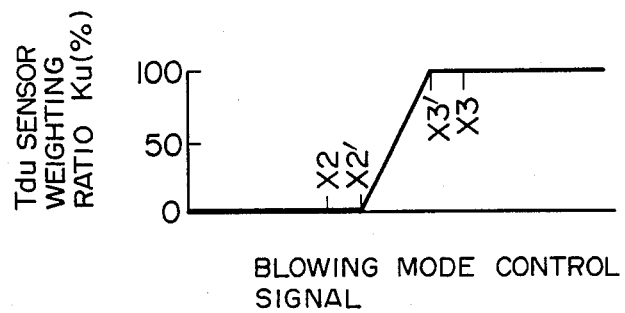
Figure 5B:
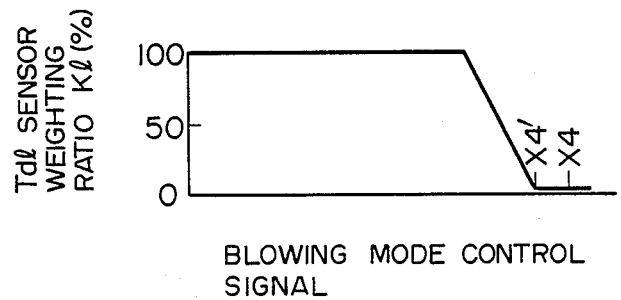

FIGS. 5A and 5B show the second embodiment of the invention. As compared with the first embodiment of FIGS. 4A and 4B, the second embodiment of FIGS. 5A and 5B differs with respect to the change position of the weighting ratio of each sensor. On the right side of the position $X_2$, the weighting ratio $K_u$ of the $T_{du}$ sensor as the weighting ratio on the upper side of the vehicle room is 0% similarly to FIG. 4A. In this range, as will be understood from FIG. 2, since no wind is blown out from the ventilation outlet port, the value of the signal $T_{du}$ from the ventilation duct sensor is not considered but the value of the signal $T_{dd}$ from the defroster duct senor is directly used to control the opening position of the upper air mixing door. In the second embodiment, the blowing mode control signal is further moved to the right on the axis of abscissa and the valu of $K_u$ is held to 0% until the position of $X_2'$. After the point of $X_2'$, the value of $K_u$ is continuously increased to a large value until the position of $X_3$. As will be understood from FIG. 2, under the condition of the blowing mode at the position $X_2'$, an enough amount of wind has already been blown out from the ventilation outlet port. The ventilation duct sensor can accurately detect the blowout temperature without being influenced by the ambient temperature. In the range from $X_2'$ to $X_3'$ of the blowing mode, since the ventilation duct sensor and defroster duct sensor can obtain sufficient wind amounts, the weighting ratios in consideration of the wind amount distribution ratios are used. In the range from $X_3'$ to $X_3$, although a small amount of wind is blown out from the defroster outlet port, a velocity of wind is small, so that the response speed (sensitivity) of the defroster duct sensor deteriorates and is easily influenced by the ambient temperature. Therefore, on the right side from this range, $K_u$ is set to 100% and the signal $T_{du}$ from the ventilation duct sensor is directly used to control the opening position of the upper air mixing door.

On the other hand, with respect to the weighting ratio $K_l$ on the lower side of the vehicle room, in only the range where an enough quantity of wind is blown out from the floor outlet port, the opening position of the lower air mixing door is controlled by using the temperature signal $T_{dl}$ from the floor duct sensor.

According to the second embodiment, a sudden change in the blowout temperature does not occur but the air mixing door can be controlled by using the duct sensor signal of the outlet port from which a sufficient amount of blowout wind can be derived. Accordingly, there is an advantage such that a temperature control system in which the response speed is improved and a higher control stability is derived can be provided.

A modification of tee invention will now be described by reference to FIGS. 1 and 3. In the case where the upper wall of the floor door 13 in FIG. 1 is perfectly partitioned as shown by a broken line, the blowout temperatures in the upper and lower portions are not mutually interfered. Therefore, the blowout temperature control in which the upper and lower portions of the vehicle room are completely independent can be realized. However, in this modification, in the blowing mode in which the floor door 13 is completely open, the wind whose temperature was adjusted by the lower air mixing door is not blown out to any place and the floor duct sensor 23 detects only the ambient temperature. On the other hand, even when the floor door 13 is slightly open, an enough high wind velocity is not obtained at the floor outlet port, so that there is a possibility such that the control of the lower air mixing doors 12 becomes unstable. In the range where the floor door 13 is fully open, the air mixing doors 12 do not need to operate. In the range where the floor door 13 is slightly open, the apparent sensitivity of the floor duct sensor is set to a low value. By allowing the sensitivity of the floor duct sensor, that is, the weighting ratio to continuously approach to 100% as the floor door is opened, the blowout temperature can be stably controlled without causing a sudden change in blowout temperature. To satisfy this characteristic, in the modification, as shown by a broken line in FIG. 3, $T_{dol}$ is used as an input of the auxiliary duct sensor weighting means 1112 and the characteristics shown in FIGS. 4A and 4B are used as a weighting ratio of the $T_{dl}$ sensor. Due to the above system, the substantial blowout temperature is converted into the object blowout temperature in the range where the floor door 13 is fully closed, namely, under the condition when the blowing mode is set to the mode on the right side of the position $X_4$, so that the lower air mixing door is not controlled. As the floor door 13 is opened, the apparent sensitivity, i.e., the weighting ratio of the floor duct sensor increases. When the floor door is perfectly open, the lower air mixing door can be controlled by directly using the blowout temperature signal $T_{dl}$ from the floor duct sensor in a manner similar to the foregoing embodiment.

As described above, according to this modification, there is an advantage such that it is possible to provide a temperature control system in which the sudden change in blowout temperature does not occur and the high control stability is derived by using the air conditioner unit which can completely independently control the blowout temperatures in the upper and lower portions of the vehicle room.

According to the invention, the blowout temperature can be controlled on the basis of the substantial average temperature which was continuously weighted in accordance with the ratio of the wind amounts from the respective outlet ports. Therefore, there is an advantage such that it is possible to provide a control system of an air conditioner for use in automobiles in which even when the blowing mode is changed, the sudden change in blowout temperature does not occur and the comfortable condition is obtained and the high control stability is derived.

I claim:

1. A blowout temperature control system of an air conditioner for use in automobiles, comprising:
    a plurality of air outlet ports whose wind amounts mutually exclusively change;
    a plurality of detecting means, provided at said air outlet ports, for detecting blowout air temperatures; and
    object blowout temperature calculating means for calculating an object blowout temperature on the basis of, temperature conditions in the inside and outside of a vehicle and a desired temperature of a passenger,
    control means for controlling a blowout air temperature, said control means including operating means for calculating a substantial blowout temperature as a weighted mean signal which is obtained by calculating a weighted mean of the detection signals from said blowout air temperature detecting means in accordance with a ratio of the wind amounts from said outlet ports.

2. A system according to claim 1, wherein said control means controls such that said object blowout temperature coincides with said substantial blowout temperature.

3. A blowout temperature control system of an air conditioner for use in vehicles, comprising:
    a ventilation duct sensor, attached to a ventilation duct, for detecting a temperature of an air which is blown out from said ventilation duct;
    a defroster duct sensor, attached to a defroster duct, for detecting a temperature of an air which is blown out from said defroster duct;
    main weighting means for weighting the temperature detected by said ventilation duct sensor by a first weighting ratio which varies depending on an amount of wind of the ventilation duct;
    an auxiliary weighting means for weighting the temperature detected by said defroster duct sensor by a second weighting ratio which is determined by said first weighting ratio;
    weighted mean means for calculating a weighted mean of the detection temperature of the ventilation duct which was weighted by said main weighting means and the detection temperature of the defroster duct which was weighted by said auxiliary weighting means, thereby determining a substantial blowout temperature;
    operating means for subtracting said substantial blowout temperature determined by said weighted mean means from a predetermined object blowout temperature, thereby calculating a deviation temperature; and
    blowout temperature control means which operates such that the deviation temperature calculated by said operating means is set to zero.

4. A blowout temperature control system of an air conditioner for use in vehicles, comprising:
    a ventilation duct sensor, attached to a ventilation duct, for detecting a temperature of an air which is blown out from said ventilation duct;
    a defroster duct sensor, attached to a defroster duct, for detecting a temperature of an air which is blown out from said defroster duct;
    ventilation/defroster doors to distribute amounts of winds which are blown out from the ventilation duct and said defroster duct;
    a floor duct sensor, attached to a floor duct, for detecting a temperature of an air which is blown out from said floor duct;
    a floor door to distribute amounts of winds which are blown out from said floor duct, said ventilation duct, and said defroster duct;

upper main weighting means for weighting the temperature detected by said ventilation duct sensor by a first upper weighting ration which varies depending o the wind amount of the ventilation duct;

upper auxiliary weighting means for weighting the temperature detected by said defroster duct sensor by a second upper weighting ratio which is determined by said first upper weighting ratio;

upper weighted mean means for calculating a weighted mean of the detection temperature of the weighting means and the detection temperature of the defroster duct which was weighted by said upper auxiliary weighting means, thereby determining an upper substantial blowout temperature;

lower main weighting means for weighting the temperature detected by said floor duct sensor by a first lower weighting ratio which varies depending on the wind amount of the floor duct;

lower auxiliary weighting means for weighting said upper substantial blowout temperature determined by said upper weighted mean means by a second lower weighting ratio decided by said first lower weighting ratio;

lower weighted mean means for calculating a weighted mean of the detection temperature of the floor duct which was weighted by said lower main weighting means and said upper substantial blowout temperature which was weighted by said lower auxiliary weighting means, thereby determining a lower substantial blowout temperature;

upper operating means for subtracting said upper substantial blowout temperature determined by said upper-weighted mean means from a predetermined upper object blowout temperature, thereby obtaining an upper deviation temperature;

lower operating means for subtracting said lower substantial blowout temperature determined by said lower weighted mean means from a predetermined lower object blowout temperature, thereby obtaining a lower deviation temperature;

upper blowout temperature control means which operates such that said upper deviation temperature calculated by said upper operating means is set to zero; and lower blowout temperature control means which operates such that said lower deviation temperature calculated by said lower operating means is set to zero.

5. A blowout temperature control system of an air conditioner for use in vehicles, comprising:

a ventilation duct sensor, attached to a ventilation duct, for detecting a temperature of an air which is blown out from said ventilation duct;

a defroster duct sensor, attached to a defroster duct, for detecting a temperature of an air which is blown out from said defroster duct;

ventilation/defroster doors to distribute amounts of winds which are blown out from the ventilation duct and said defroster duct;

a floor duct sensor, attached to a floor duct, for detecting a temperature of an air which is blown out from said floor duct;

a floor door to distribute amounts of winds which are blown out from said floor duct, said ventilation duct, and said defroster duct;

upper main weighting means for weighting the temperature detected by said ventilation duct sensor by a first upper weighting ratio which varies depending on the wind amount of the ventilation duct;

upper auxiliary weighting means for weighting the temperature detected by said defroster duct sensor by a second upper weighting ratio which is determined by said first upper weighting ratio;

upper weighted mean of the detection temperature of the ventilation duct which was weighted by said upper main weighting means and the detection temperature of the defroster duct which was weighted by said upper auxiliary weighting means, thereby determining an upper substantial blowout temperature;

lower main weighting means for weighting the temperature detected by said floor duct sensor by a first lower weighting ratio which varies depending on the wind amount of the floor duct;

lower auxiliary weighting means for weighting said upper substantial blowout temperature determined by said upper weighted mean means by a second lower weighting ratio which is determined by said first lower weighting ratio;

lower weighted mean means for calculating a weighted mean of the detection temperature of the floor duct which was weighted by said lower main weighting means and said upper substantial blowout temperature which was weighted by said lower auxiliary weighting means, thereby determining a lower substantial blowout temperature;

first upper operating means for providing an upper object blowout temperature which is calculated on the basis of a first function of a temperature detected by an outside air temperature sensor;

second upper operating means for subtracting said upper substantial blowout temperature determined by said upper weighted means from said upper object blowout temperature provided by said first upper operating means, thereby obtaining an upper deviation temperature;

first lower operating means for providing a lower object blowout temperature which is calculated on the basis of a second function of the temperature detected by said outside air temperature sensor;

second lower operating means for subtracting said lower substantial blowout temperature determined by said lower weighted means means from said lower object blowout temperature provided from said first lower operating means, thereby obtaining a lower deviation temperature;

upper blowout temperature control means which operates such that said upper deviation temperature calculated by said second upper operating means is set to zero; and lower blowout temperature control means which operates such that said lower deviation temperature calculated by said second lower operating means is set to zero.

* * * * *